United States Patent [19]

Takimoto et al.

[11] Patent Number: 5,315,220
[45] Date of Patent: May 24, 1994

[54] MEMORY METHOD OF DOOR OPENING AND SHUTTING STROKE VALUE IN AUTOMATIC DOOR

[75] Inventors: Akiyoshi Takimoto; Tamotsu Tanaka; Yukio Yoshida, all of Toyama, Japan

[73] Assignee: Yoshida Kogyo K.K., Tokyo, Japan

[21] Appl. No.: 903,483

[22] Filed: Jun. 24, 1992

[30] Foreign Application Priority Data

Jun. 26, 1991 [JP] Japan .................. 3-180591

[51] Int. Cl.⁵ .................. E05F 15/00; H02P 3/20
[52] U.S. Cl. .................. 318/282; 318/286; 318/266
[58] Field of Search .................. 318/280–288, 318/466, 603; 187/28, 29.1, 100–133, 51, 52; 49/25, 360, 280, 167, 116, 194, 138, 199, 357, 358, 59

[56] References Cited

U.S. PATENT DOCUMENTS

| | | | |
|---|---|---|---|
| 4,090,113 | 5/1978 | Ogishi | 318/282 |
| 4,449,078 | 5/1984 | Ogishi et al. | 318/102 |
| 4,563,625 | 1/1986 | Kornbrekke et al. | 318/603 |
| 4,673,848 | 6/1987 | Hagiwara et al. | 318/266 |
| 4,775,823 | 10/1988 | Yoshida et al. | 318/266 |
| 4,924,154 | 5/1990 | Ogino | 318/286 |
| 4,935,677 | 6/1990 | Yoshida | 318/266 |
| 4,959,598 | 9/1990 | Yoshida et al. | 318/599 |
| 4,994,724 | 2/1991 | Hsu | 318/603 |
| 4,999,551 | 3/1991 | Yoshida et al. | 318/286 |
| 5,162,711 | 11/1992 | Heckler | 318/264 |

Primary Examiner—Paul Ip
Attorney, Agent, or Firm—Hill, Steadman & Simpson

[57] ABSTRACT

The door can be safely and exactly opened and shut even when the door opening and shutting stroke value is not memorized in the non-volatile memory. The door opening and shutting stroke value measured in the setting time of the automatic door is memorized in the non-volatile memory 14. Then, the memorized door opening and shutting stroke value is read in the plant memory 15 for the door stroke value of the micro-computor 12. In the automatic door for opening and shutting the door 5 according to the door opening and shutting stroke value, when the door opening and shutting stroke value is not memorized in the non-volatile memory 14 after the power supply, the door 5 is opened and shut at the low speed to measure the door stroke value. And the door stroke value is memorized in the plant memory 15 for the door stroke value of the micro-computor 12 as the door opening and shutting stroke value, and the door 5 is opened and shut in accordance with the memorized value.

1 Claim, 3 Drawing Sheets

MEMORY METHOD OF DOOR OPENING AND SHUTTING STROKE VALUE IN AUTOMATIC DOOR

BACKGROUND OF THE INVENTION

1. Field of the Invention

This invention relates to a method for memorizing a door opening and shutting stroke value as a control standard of a door opening and shutting operation in an automatic door.

2. Prior Art

An apparatus for controlling a door opening and shutting operation in an automatic door is disclosed in Japanese Patent Publication H2-4747. In the cited reference, the disclosed apparatus comprises means for opening and shutting a door at a low speed with a power supply signal and a length measuring mode signal, means for measuring the stroke of the door in the low speed opening and shutting operation, and a non-volatile memory for memorizing the measured value as the door opening and shutting stroke value, wherein the door opening and shutting stroke value is measured in the setting of the automatic door to be memorized in the non-volatile memory so as to control the door opening and shutting operation based on the door opening and shutting stroke value at the power supply time.

With this apparatus, since the door opening and shutting stroke value is measured only in the setting of the automatic door and at the power supply time, the door opening and shutting stroke value memorized in the non-volatile memory is read out from the memory for the door stroke of the micro-computer to be able to control the door opening and shutting operation, it is not required to measure the door opening and shutting stroke value at every power supply time.

However, since in the aforementioned apparatus, only the measured door stroke value is memorized in the non-volatile memory, if the door opening and shutting stroke value is not memorized in the non-volatile memory on account of the failures of the non-volatile memory, communication errors, non-setting and like, the exact opening and shutting operation of the door can be not controlled, so that there is a risk that the door may strike a passer-by.

SUMMARY OF THE INVENTION

It is therefore an object of this invention to provide a memory method for memorizing a door opening and shutting stroke value of an automatic door so as to overcome the aforementioned disadvantages.

According to this invention, there is provided a memory method for a door opening and shutting stroke value of an automatic door comprising the steps of, opening and shutting a door 5 at a low speed to measure the door stroke value when the door opening and shutting stroke value is not memorized in a non-volatile memory when power is first supplied, and memorizing the door stroke value in a memory 15 for a door stroke value of a micro-computer 12 as a door opening and shutting stroke value.

In operation, since the door stroke value is newly measured after each supply of the power and memorized as the door opening and shutting stroke value when the door opening and shutting stroke value is not memorized in the non-volatile memory 14, the door is safely and exactly opened and shut even when the door opening and shutting stroke value is not memorized in the non-volatile memory 14.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION

Figure 1:
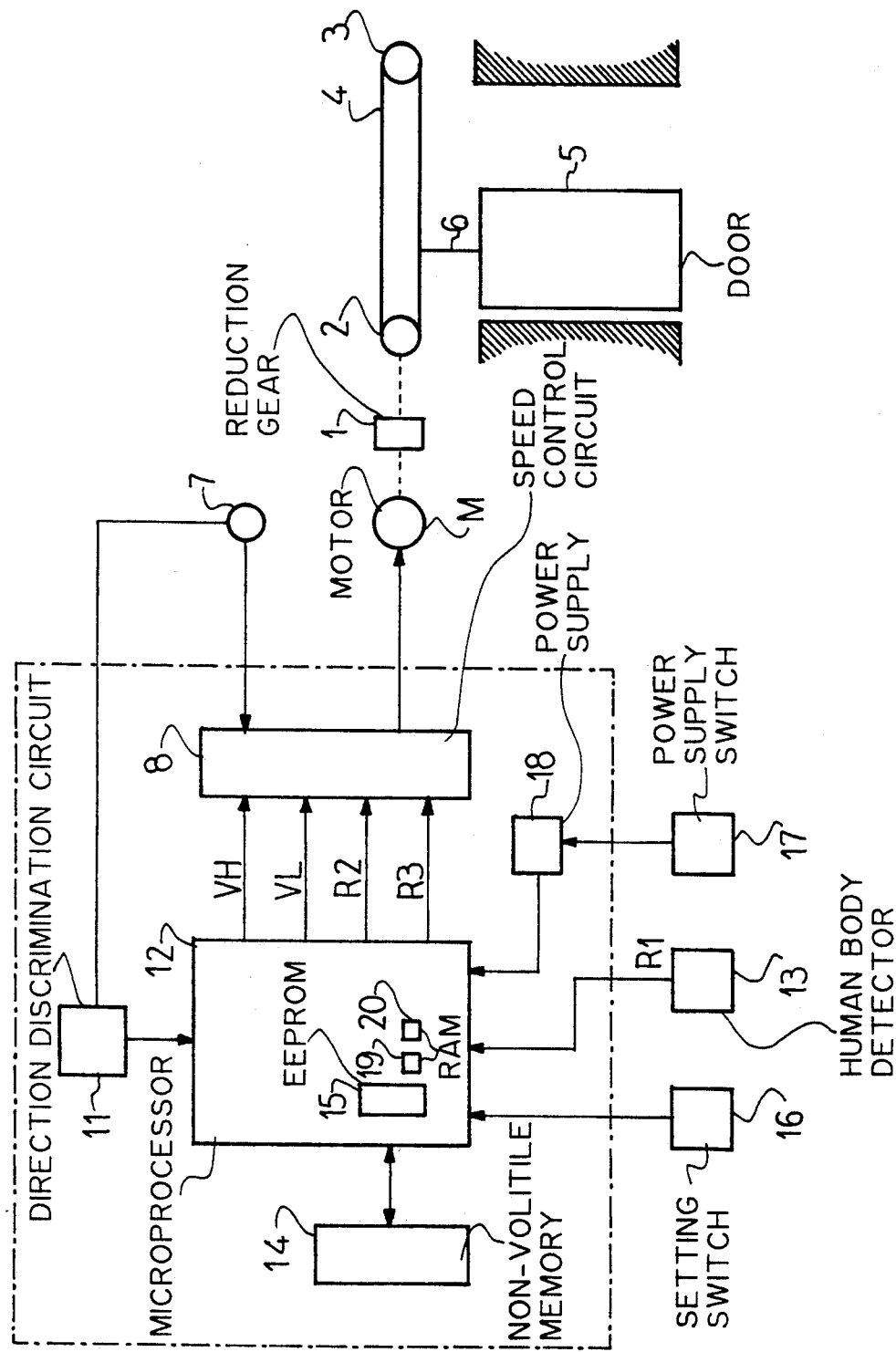
FIG. 1 is a schematic illustration of an automatic door.
Figure 2:
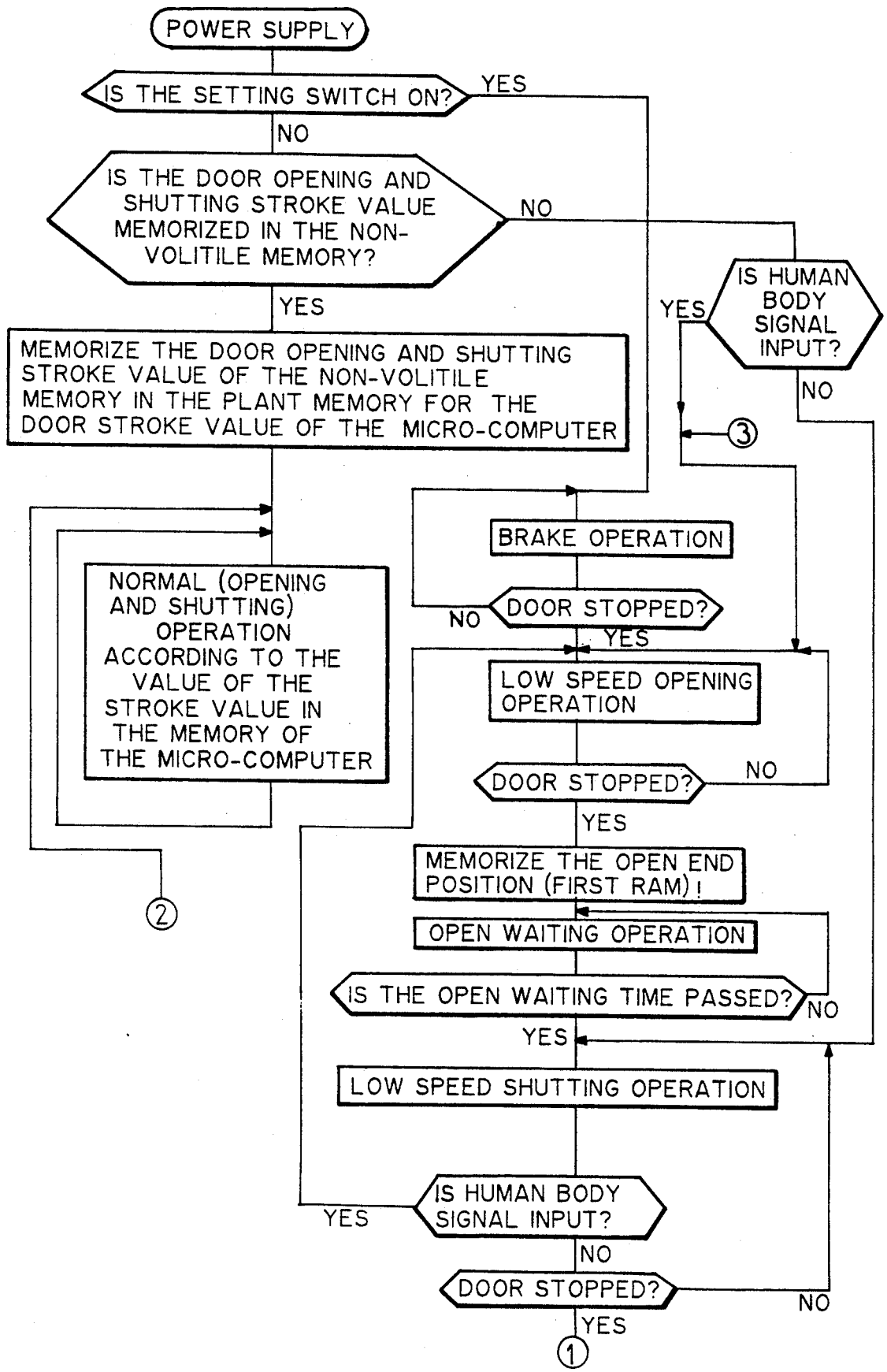
FIG. 2 is an operation flow chart.
Figure 3:
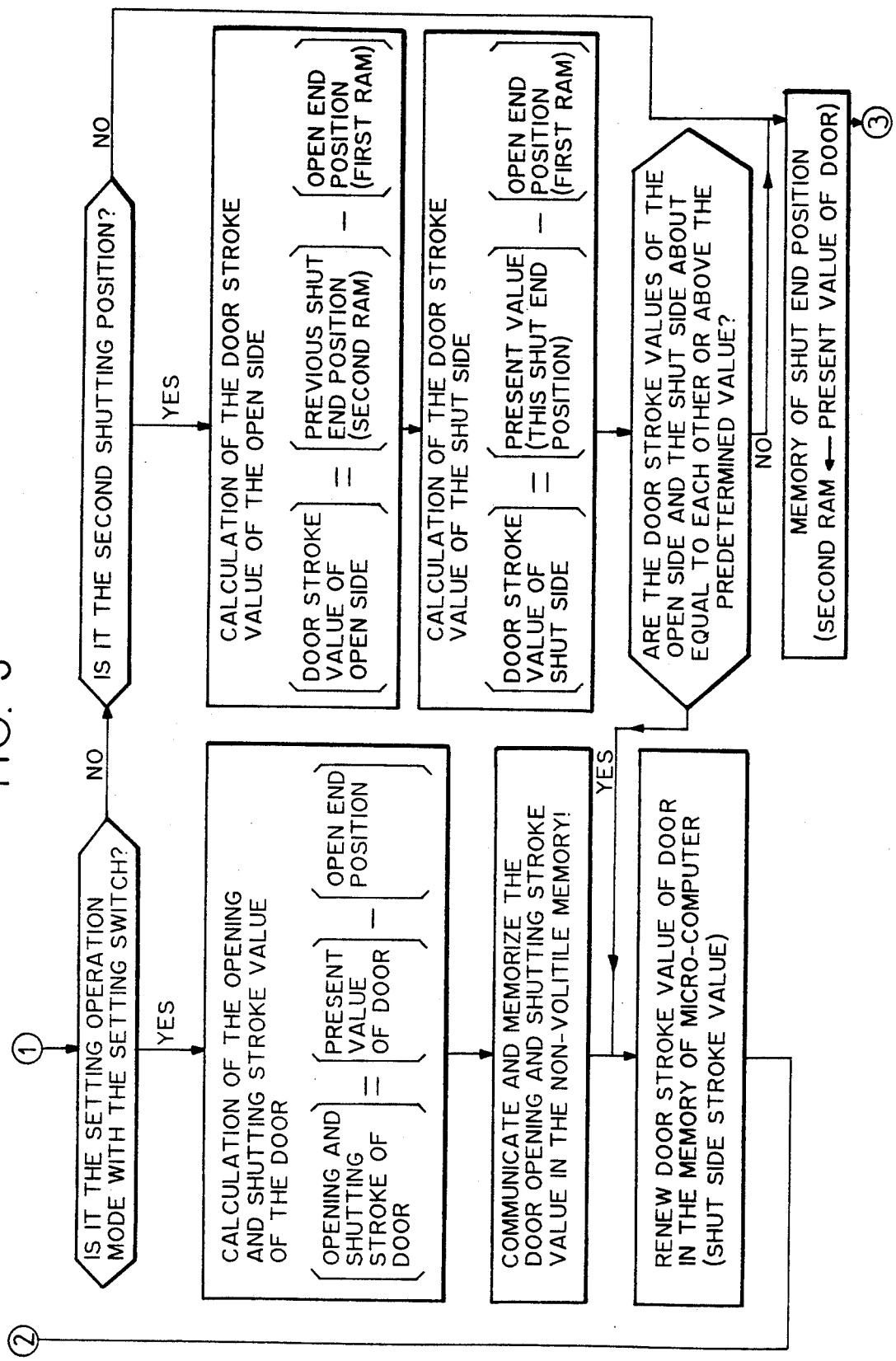
FIG. 3 is the operation flow chart continued from FIG. 2.

An embodiment of this invention will be described with reference to the drawing figures. As shown in FIG. 1, a motor M is connected through a reduction gear 1 to a drive pulley 2. A door driving belt 4 is wound around a drive pulley 2 and a driven pulley 3. A door 5 is connected to the belt 4 by means of a connector 6. The door 5 is moved to open and shut the doorway by normally and reversely rotating the motor M.

The aforementioned motor M is a DC-brushless motor and an output of a rotation frequency produced from a pulse detecting circuit contained in the motor M is applied to a speed control circuit 8. A rotary direction detecting signal is applied through a direction discrimination circuit 11 to a micro-computor 12.

A human body detecting signal R1 is applied from a human body detector 13 such as a mat switch, a phototube and like to the micro-computor 12, and a predetermined control signal is applied by the signal R1 to the speed control circuit 8 to drive the motor M.

Finally, a high speed signal VH, a low speed signal VL, a normal rotation signal R2, and a reverse rotation signal R3 are applied from the micro-computor 12 to the speed control circuit 8 to control the motor M at the high and low speeds, and at the normal and reverse rotations. element 14 is a write permit non-volatile memory, (EEPROM) element 15 is a element memory for the door stroke value in the micro-computor 12, element 16 is a setting switch, element 17 is a power supply switch, and element 18 is a power supply circuit.

Next, the operation of measuring and memorizing the door opening and shutting stroke value will be illustrated.

In operation for measuring and memorizing the stroke length at setting time;

When electric power is supplied by a power supply switch 17 and a signal is applied from a setting switch 16 to a micro-computor 12, the micro-computor 12 is set to the length measuring mode at the setting time.

When in this mode, the motor M is braked by means of a brake (not shown in the drawing) to stop the door 5. After the door 5 is stopped, the low speed signal VL and the normal rotation signal R2 are applied from micro-computor 12 to drive the motor M at the low speed and the normal rotation so as to open the door 5 at the low speed. When the door 5 is stopped at the open end, the open end position is memorized in a first RAM 19.

And when a predetermined open waiting time is passed, the low speed signal VL and the reverse rotation signal R3 are applied from the micro-computor 12 to drive the motor M at the low speed and the reverse rotation so as to shut the door 5 at low speed. During this low speed shutting operation, when a human body detecting signal R1 is applied from a human body detector 13 to the micro-computer 12, the door 5 is opened at the low speed as well as above-mentioned.

When the door 5 is stopped at the shut end position, it is judged whether it is a setting operation with a signal input of the setting switch 16 or not, and if it is the setting operation, the opening and shutting stroke value of the door 5 is calculated to measure the stroke length.

Then, the door opening and shutting stroke value is a length between a shut end position and an open end position. The open end position memorized in the first RAM 19 is subtracted from the shut end position value to calculate the door stroke value so as to measure the length of the door stroke.

The measured door opening and shutting stroke value is communicated and memorized in the non-volatile memory 14 to renew the value of the memory 15 for the door stroke in the micro-computer 12.

In operation at power supply time after setting;

When a power supply switch 17 is turned on to supply the power and the on-signal is not applied from a setting switch 16, the normal opening and shutting mode is maintained without going into the setting time measuring mode. When the door stroke value is memorized in the non-volatile memory 14, the memorized door opening and shutting stroke value is read in the memory 15 for the door stroke value of the micro-computor 12. When the human body detecting signal R1 is applied to the micro-computer 12, the door is controlled at the normal opening and shutting operation in accordance with the door opening and shutting stroke value.

On the other hand, when the door opening and shutting stroke value is not memorized in the non-volatile memory 14, the normal operation is not carried out. When the human body detecting signal R1 is applied from the human body detector 13 to the micro-computor 12, the door 5 is opened at the low speed to memorize the open end position in the first RAM 19 and after the predetermined open waiting time is passed, the door 5 is shut at the low speed.

In the low speed shutting operation of the door 5, when the human body detecting signal R1 is applied to the micro-computor 12, as well as mentioned, the door 5 is opened at the low speed and is again shut at the low speed.

When the door 5 is moved in the low speed shutting operation and reached to the shut stroke end, because the opening and shutting operation is not carried-out with the setting switch, it is judged whether it is a second shut position or not. Since this time is a first shut position, the first shut end position is memorized in a second RAM 19. And the door 5 is again moved at the low speed opening operation and the open end position is memorized in the first RAM 19. Thereafter, the door 5 is moved in the low speed shutting operation, and when the door 5 is reached to the second shut end position, the open end position is subtracted from the previous shut end position memorized in the second RAM 20 to calculate the door stroke value at being moved in the opening direction, namely the door stroke value on the shut side. The shut side and open side door stroke values are compared with each other, and when these values are about equal and reached to the predetermined value required in the door opening and shutting, the door stroke value is read in the memory 15 for the door stroke value of the micro-computor 12 as the door opening and shutting stroke value. Thereafter, when the human body detecting signal R1 is applied to the micro-computor 12, the door 5 is moved at the normal opening and shutting operation based on the door opening and shutting stroke of the memory 15. When the shut side and open side door stroke values are different, the above operation is again repeated. As above-mentioned, in measuring the stroke length with the setting switch, the worker can look to the operation to measure only the door shutting stroke and immediately memorize it in the non-volatile memory. In the case that the stroke length is not measured with the setting switch and the stroke value is not memorized in the non-volatile memory, the shutting stroke and opening stroke are measured for safety to confirm the agreement of the both strokes so as to use the stroke value as the door stroke.

According to this invention, since the door stroke value is newly measured each time the power is supplied and memorized in the plant memory 15 for the door stroke value of the micro-computor 12 when the door opening and shutting stroke value is not memorized in the non-volatile memory 14, the door 5 can be safely and exactly opened and shut even when the door opening and shutting stroke value is not memorized in the non-volatile memory 14.

While a preferred embodiment of the invention has been described using specific terms, such description is for illustrative purpose only, and it is to be understood that changes and variations may be made without departing from the spirit or scope of the following claims.

What is claimed is:

1. A method for controlling a door opening and shutting operation of an automatic door apparatus including steps of, memorizing a door opening and shutting stroke value measured at a setting time of the automatic door in a non-volatile memory, and reading out the door opening and shutting stroke value memorized in a memory for the door stroke value of a micro-computer 12 after power is supplied,
    a memory method for memorizing the door opening and shutting stroke value of said automatic door comprising the steps of:
    opening and shutting a door at a low speed to measure the door stroke value when the door opening and shutting stroke value is not memorized in said non-volatile memory each time the power is supplied to the automatic door apparatus;
    memorizing the door stroke value in said memory for the door stroke value of said micro-computer as the door opening and shutting stroke value;
    calculating the shut side and open side door stroke values in opening and shutting said door at a low speed to measure the door stroke value; and
    determining the measured stroke value as the door stroke value when both stroke values are about equal to each other.

* * * * *